United States Patent
Winbom

(10) Patent No.: US 9,355,047 B2
(45) Date of Patent: *May 31, 2016

(54) METHOD AND DEVICES FOR CONTROLLING OPERATIONS OF A CENTRAL PROCESSING UNIT

(71) Applicant: Nasdaq Technology AB, Stockholm (SE)

(72) Inventor: Hakan Winbom, Sollentuna (SE)

(73) Assignee: Nasdaq Technology AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,643

(22) Filed: Jan. 2, 2015

(65) Prior Publication Data

US 2015/0121118 A1    Apr. 30, 2015

Related U.S. Application Data

(63) Continuation of application No. 13/324,164, filed on Dec. 13, 2011, now Pat. No. 8,930,737.

(51) Int. Cl.
| | |
|---|---|
| *G06F 13/22* | (2006.01) |
| *G06F 1/08* | (2006.01) |
| *G06F 1/32* | (2006.01) |
| *H04L 12/64* | (2006.01) |

(52) U.S. Cl.
CPC ........ *G06F 13/22* (2013.01); *G06F 1/08* (2013.01); *G06F 1/324* (2013.01); *G06F 1/3209* (2013.01); *G06F 1/3234* (2013.01); *H04L 12/6418* (2013.01); *Y02B 60/1217* (2013.01)

(58) Field of Classification Search
CPC ..... G06F 13/22; G06F 1/3209; G06F 1/3234; G06F 1/324; G06F 1/08; H04L 12/6418; Y02B 60/1217
See application file for complete search history.

(56) References Cited

U.S. PATENT DOCUMENTS

| | | | |
|---|---|---|---|
| 5,614,891 A | * | 3/1997 | Zeinstra ................. B60R 1/088 340/12.24 |
| 6,931,524 B2 | * | 8/2005 | Ehmann et al. ............... 713/100 |
| 7,463,993 B2 | | 12/2008 | Finkelstein et al. |

(Continued)

FOREIGN PATENT DOCUMENTS

| | | |
|---|---|---|
| GB | 2 454 914 | 5/2009 |
| WO | WO 2009/038641 | 3/2009 |

OTHER PUBLICATIONS

Chang, "Terminal Response Times in Data Communications Systems", *IBM J. Res. Develop.*, (No Date), pp. 272-282.

(Continued)

*Primary Examiner* — M Elamin
(74) *Attorney, Agent, or Firm* — Nixon & Vanderhye P.C.

(57) ABSTRACT

Control circuitry controls the operations of a central processing unit, CPU, which is associated with a nominal clock frequency. The CPU is further coupled to an I/O range and configured to deliver input to an application. The control circuitry controls the CPU to poll the I/O range for input to the application. The control circuitry also monitors whether or not each poll results in input to the application and adjusts a clock frequency at which the CPU operates to a clock frequency lower than the nominal clock frequency if a predefined number of polls resulting in no input is detected. Methods and a central computer server of an automated exchange system are also provided.

20 Claims, 6 Drawing Sheets

(56) References Cited

U.S. PATENT DOCUMENTS

| | | |
|---|---|---|
| 7,634,678 B2 | 12/2009 | Winbom |
| 7,822,397 B2* | 10/2010 | Horvath ................ H04B 1/713 455/161.1 |
| 7,882,369 B1 | 2/2011 | Kelleher et al. |
| 8,356,119 B2 | 1/2013 | Kocherry et al. |
| 8,552,807 B2 | 10/2013 | Ou-Yang |
| 8,724,612 B2 | 5/2014 | Al-Khudairi |
| 8,792,354 B2 | 7/2014 | Gnanasekaran et al. |
| 8,930,737 B2* | 1/2015 | Winbom ....................... 713/323 |
| 8,972,352 B1* | 3/2015 | Roche et al. ................. 707/640 |
| 2003/0076442 A1* | 4/2003 | Kawaguchi et al. .......... 348/375 |
| 2003/0097603 A1 | 5/2003 | Athas |
| 2004/0019844 A1* | 1/2004 | Goodnow ............. H04L 1/0017 714/798 |
| 2004/0207540 A1 | 10/2004 | Tanaka |
| 2005/0030913 A1 | 2/2005 | Roy |
| 2005/0068974 A1 | 3/2005 | Barker et al. |
| 2006/0146914 A1* | 7/2006 | Horvath ................ H04B 1/713 375/137 |
| 2008/0235532 A1* | 9/2008 | Pomerantz ........................ 714/3 |
| 2009/0132844 A1 | 5/2009 | Allarey et al. |
| 2011/0023040 A1 | 1/2011 | Hendry et al. |
| 2012/0161967 A1 | 6/2012 | Stern |

OTHER PUBLICATIONS

Fiske et al., "Thread Prioritization: A Thread Scheduling Mechanism for Multiple-Context Parallel Processors", *Proceedings of the 1st International Symposium on HPCA*, Jan. 1995, 12 pages.

* cited by examiner

METHOD AND DEVICES FOR CONTROLLING OPERATIONS OF A CENTRAL PROCESSING UNIT

This application is a continuation of U.S. patent application Ser. No. 13/324,164, filed Dec. 13, 2011 now U.S. Pat. No. 8,930,737, the entire contents of which are hereby incorporated by reference in this application.

TECHNICAL FIELD

The present invention relates to a method and devices for controlling operations of a Central Processing Unit (CPU), and more particularly it relates to a control circuitry configured to interact with the Central Processing Unit.

BACKGROUND

The roll out of Internet and the following continuous investment in infrastructure providing network access to the Internet have made information exchange easy throughout the globe. With the global access to all sorts of different computer systems the Internet provides for and the increasing use of the Internet, the numbers of data messages directed to central computer servers of the computer systems are increasing. Many computer systems are connected to the Internet to provide access to functionalities for a select group of people or for the public. Depending on the functionalities and the interest people have in accessing the functionalities, different computer systems receive different amounts of data messages.

An automated electronic exchange is one such type of computer system wherein users of the automated electronic exchange in one way or another connect to a central computer server which is part of the automated electronic exchange, usually through the Internet, and submit data messages to the central computer server.

Due to technological advances in computing technology, transaction technology and information technology in the past ten to twenty years, financial technology has had a very rapid development rate. This rapid development has resulted in computer systems trying to cope with increasing numbers of companies and people trying to connect to these systems. The increasing numbers of users being connected to electronic exchange systems have increased the amount of data messages sent into the system.

A conventional electronic exchange typically receives input data in the form of data messages from external devices, trader terminals, used by traders to send orders and/or quotes to the electronic exchange. The orders/quotes may relate to buying and/or selling of any type of tradable asset. In particular the input data can relate an order message that represents the placing of a new buy or sell order or a new quote. Furthermore, the development of algorithmic trading, i.e. computers programmed to analyze data and autonomously act on the data by submitting orders to an electronic exchange, has exponentially increased the amount of data messages being sent to the electronic exchange systems.

In order for computer systems to perform some kind of action in response to the data messages sent by users of the computer system the data messages have to be received in some kind of input/output device and detected as input.

Traditionally one way of detecting a data message input in a computer system has been to do it in an interrupt driven process. Input received by an input/output (I/O) device of the computer server of the computer system has triggered an interrupt request to be issued. A central processing unit (CPU) of the computer system typically breaks (interrupts) its current computations and stores the current state when receiving the interrupt request. The CPU then processes a set of stored instructions related to the specific interrupt request. When all instructions related to the interrupt request have been completed, the CPU reverts back to the stored state and continues processing the set of instructions it was processing prior to the interrupt request. The transition between states of processing in the CPU is typically called a context switch. When no interrupt request is received by the CPU, or when the CPU is finished with the current processing, the CPU can revert to an idle mode.

Another technique to detect input to a computer system is to have the CPU poll an I/O device for input, i.e. continuously check the I/O device until input is found, and then process the input when a poll renders input.

The interrupt driven detection and handling of input has the advantage that the CPU when not processing input can process other instructions. The polling technique has the advantage that input generally is detected and processed earlier as the CPU expects to find and is ready to process any input each poll (check) of the I/O device might render.

A disadvantage with the interrupt driven technique is that, when receiving huge amounts of data messages for computer systems requiring a high throughput, the interrupt driven process may be experienced as giving rise to a too high latency. Latency is defined as the time from an input data message is received by the computer system until the computer system has completed processing the data message and is ready receive a new data message. The interrupt driven techniques is therefore less suitable for systems with low latency requirements.

A disadvantage with the polling technique is that, while it allows for a low latency system, there is a risk that the CPU is constantly working at full load just polling the I/O device even at times when there is no input to retrieve. For most computer systems, the data messages do not arrive in a steady stream but the amount of data messages directed towards the computer system varies quite a lot over time with peaks and troughs. Thus while, the polling techniques are suitable for periods with peak load, polling for input is not particularly suitable for periods of trough load as large numbers of polls resulting in no input have to be performed, so-called negative polls. The negative polls of the polling techniques cause unnecessarily high processing load as well as energy consumption of the CPU.

For many computer systems a swift change in load is a problem, for automated electronic exchanges it is a particular problem. Since information is easily spread globally, many users of an automated electronic exchange tend to act on the same information at almost the same time. Therefore peaks often are concentrated around occasions when information, that in one way or another might change the appreciation made by users connected to the automated electronic exchange, is released somewhere in the world. The number of data messages directed toward the automated electronic exchanges, hence shifts very drastically between peaks and troughs throughout a trading day.

It would thus be advantageous to provide a more flexible and efficient way of processing input received in a computer system.

SUMMARY

An object of the embodiments of the present invention is to provide a method and apparatus that allow a CPU to process input in a flexible and efficient way.

The above stated object is achieved by a method, a control circuitry and a computer server according to the independent claims.

A first embodiment provides, a method for controlling the operations of a Central Processing Unit (CPU) associated with a nominal clock frequency. The CPU is coupled to an input/output (I/O) range and configured to deliver input to an application. The method comprises controlling the CPU to poll the I/O range for input to the application. The polling is repeated until a poll results in input to the application. The method further comprises monitoring whether or not each poll results in input to the application and adjusting a clock frequency at which the CPU operates, to a predetermined first clock frequency lower than the nominal clock frequency, if a pre-defined number of polls resulting in no input is detected.

A second embodiment provides a control circuitry for controlling a CPU associated with a nominal clock frequency. The CPU is coupled to an I/O range and configured to deliver input received at the I/O range to an application. The control circuitry is arranged to instruct the CPU to poll the I/O range for input to the application and to monitor whether or not a poll results in input to the application. The control circuitry is further arranged to adjust a clock frequency at which the CPU operates, to a predetermined first clock frequency lower than the nominal clock frequency, if a pre-defined number of polls of the I/O range resulting in no input is detected.

A third embodiment provides a central computer server of an automated exchange system for matching orders received from clients. The central computer server comprises an I/O range for receiving orders from clients in the automated exchange system and a CPU associated with a matching process for matching received orders. The CPU is coupled to the I/O range. The central computer server further comprises a control circuitry in accordance with the second embodiment described above for controlling the CPU to poll the I/O range for received orders for input to the matching process.

An advantage of some of the embodiments disclosed herein is that processing by a CPU can be performed with lower energy consumption while providing for rapid response to input. These and other aspects and advantages of different embodiments will become apparent from the following detailed description and from the accompanying drawings.

BRIEF DESCRIPTION OF THE DRAWINGS

In the following description of embodiments of the invention, reference will be made to the accompanying drawings of which.

DETAILED DESCRIPTION

Some example embodiments will now be described in more detail with use of the figures.

Depending on the use and configuration of a computer system different capabilities are provided and also required of it. For computer systems processing input data in a Central Processing Unit (CPU) it is typically advantageous to detect and process data as quickly as feasible in order to potentially be able to service as many inputs as possible. As described above it is of interest that the CPU processes input in a flexible and efficient way. Embodiments to be described in further detail below achieve this by controlling the operations of the CPU by use of a frequency adjusting control circuitry. By controlling the operations of the CPU as well as the frequency at which the CPU operates advantageous effects in regards to thermal energy, processing power, latency and throughput can be achieved.

Figure 1:
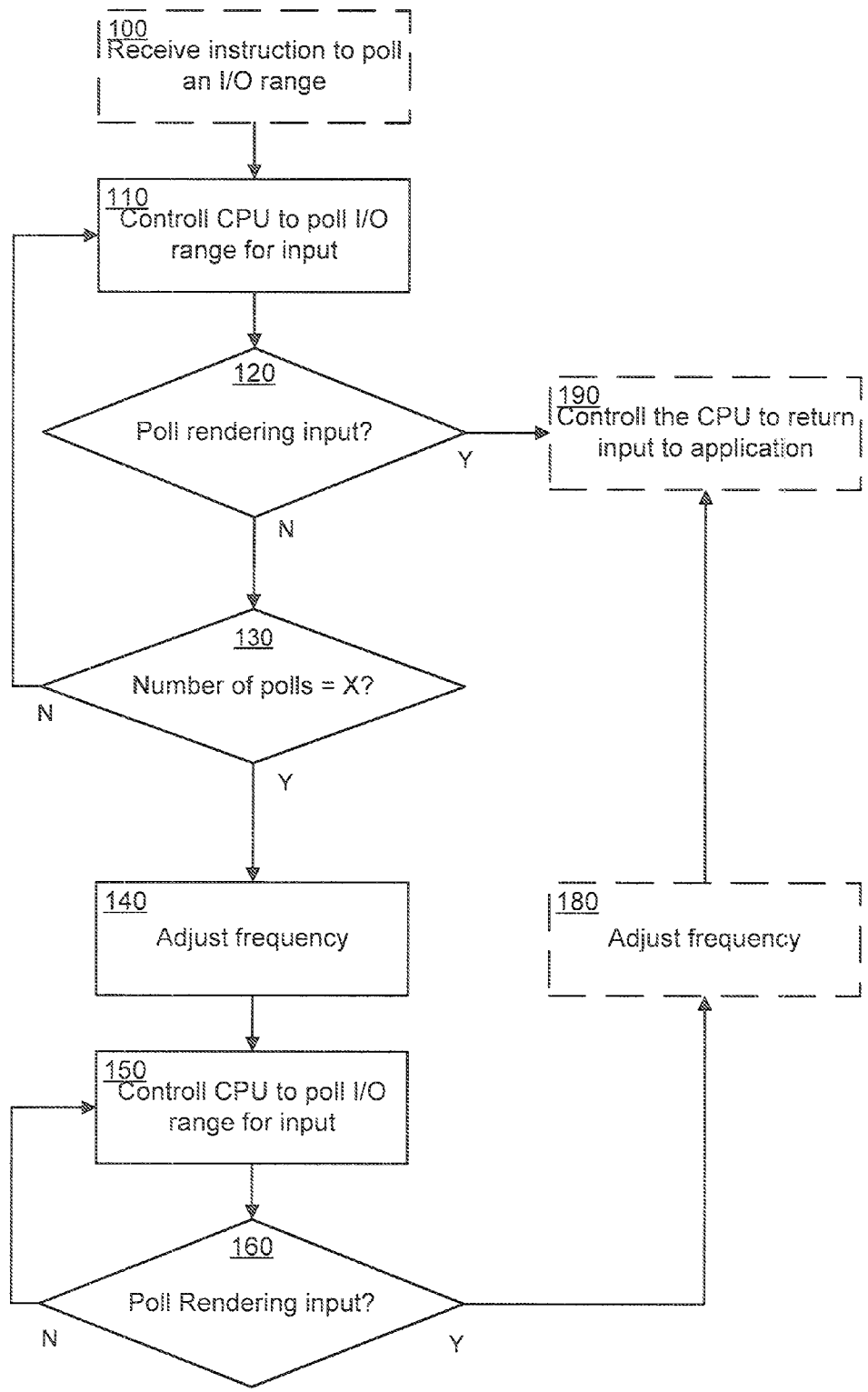
FIG. 1 is a flow diagram illustrating an embodiment of a method for controlling operations of a CPU.

FIG. 1 is a flowchart illustrating an example embodiment of a method for controlling operations of a CPU. The example method is adapted for use in a control circuitry for controlling the operations of the CPU. The CPU is associated with a nominal clock frequency. The CPU is further coupled to an input/output, I/O, range and configured to deliver input to an application. The application may be practically any type of application program processing input, such as an order matching process of an automated exchange system.

For illustrative purposes below, it is envisaged that the operating frequency of the CPU when the method is initialized, is the nominal clock frequency. However, the actual configuration and architecture of a particular system will of course determine an actual operating frequency for the particular system.

The method outlined in FIG. 1 in step 110, comprises controlling the CPU to poll the I/O range for input to the application. The method further comprises a step 120 of monitoring whether or not each poll results in input to the application. If it is detected in the step 120 that a poll results in input to the application, the CPU is controlled to return the input to the application in a step 190. If a poll is a negative poll, i.e. results in no input to the application, it is determined in a step 130, if a pre-defined number (X) of negative polls have been detected.

The number of consecutive negative polls may for example be counted by incrementing an accumulator register of the CPU for each negative poll. The accumulator register may also, when a poll is positive i.e. renders input to the application, be reset. The accumulated number of consecutive negative polls may then be compared to the pre-defined number. When it is detected that the pre-defined number of consecutive negative polls has been performed, the frequency at which the CPU operates is adjusted to a pre-determined first clock frequency lower than the nominal clock frequency in a step 140. Assuming that the CPU operated at the nominal clock frequency when the method was initiated, performing the step 140 will thus lead to a reduction of the clock frequency at which the CPU operates. In a step 150 the CPU is controlled to again poll for input to the application, which thus is carried out at the reduced frequency following the step 140. As a consequence the CPU will continue to poll the I/O range for input to the application less frequently, which reduces the processing load as well as energy consumption of the CPU. When a poll at the reduced frequency results in input to the application, the CPU is controlled to return the input to the application in the step 190. Thus, according to the example method illustrated in FIG. 1, the CPU is controlled to repeat the polling until a poll results in input to the application. But the frequency at which this polling is carried out may be changed depending on the amount of detected negative polls.

The pre-defined number of negative polls to be detected before an adjustment of the operating frequency of the CPU can be set to any number which is considered appropriate in the particular application scenario as a trigger for adjusting down the operating frequency. The number which is considered appropriate may depend on the type of system employing the method and also on a tradeoff between thermal efficiency and input detection speed. By allowing a higher number of negative polls before adjusting down the operating frequency, a high detection speed can be achieved at the risk of worse long term thermal efficiency. However, if thermal efficiency is more important a smaller number of negative polls should be allowed before adjusting the operating frequency. The pre-defined number may be optimized based on the expected load of the system and the requirements put on the system.

In an example embodiment, the operating frequency is reduced directly after detecting a single negative poll. The configuration of the pre-defined number to one has the advantage that it results in a high thermal efficiency. Hence in some embodiments, the pre-defined number equals one. In these embodiments the number of negative polls may be kept low by continuing polling at a reduced speed as soon as a negative poll is detected. The total amount of energy the CPU wastes on negative polls may thus also be kept low. At the same time the system still allows for a high throughput as latency is not increased when a positive poll is followed by another positive poll By reducing the clock frequency at which the CPU operates the amount of negative polls can be kept down to assure that the CPU is not wasting energy by just polling for input when no input is available. However, the processing by the CPU of any received input at the reduced frequency will lead to increased latency in comparison to the CPU operating at the nominal frequency. The latency is increased as each clock cycle used to process the input is longer. Therefore it is advantageous to increase the operating frequency of the processor for every input detected when the processor is operating at the reduced clock frequency. Hence, according to some example embodiments, the method illustrated in FIG. 1 further comprises an optional step 180 in which the clock frequency at which the CPU operates is adjusted to a predetermined second clock frequency higher than the reduced clock frequency set in the step 140. The step 180 is performed if it is detected in the step 160 that a poll results in input to the application.

In some embodiments, the predetermined second clock frequency equals the nominal clock frequency in other embodiments the predetermined second clock frequency is higher than the nominal clock frequency. By increasing the operating frequency of the CPU, to the nominal clock frequency associated with the CPU, the processing of a received input can be performed using less time. The increase of the operating frequency thus leads to reduced latency than if processed while the processor operates at the reduced frequency. As increased operating frequency leads to reduced latency it is further advantageous to increase the operating frequency of the CPU to a frequency higher than the nominal clock frequency associated with the CPU. This may be possible for a limited period if the CPU e.g. has been cooling down by operating at the reduced frequency for some time as will be further explained below in connection with another example embodiment.

In some embodiments the polling is performed in response to reception of an instruction from the application, step 100. The instruction may also specify to poll the I/O range for input to the application until a poll results in input to the application.

In some embodiments the control circuitry is also configured to detect polling of an I/O range. The control circuitry is configured to monitor read operations on the I/O range and a poll resulting in no input is detected by detecting a return to the same instruction to read the I/O range within a pre-determined number of instructions.

Figure 2:
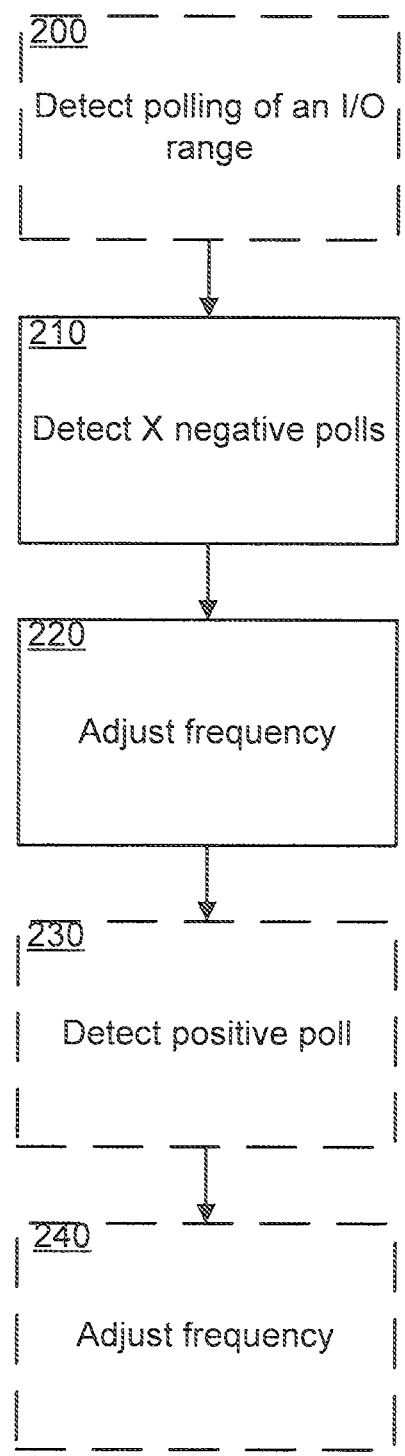
FIG. 2 is a flow diagram illustrating an alternative embodiment of a method for controlling operations of a CPU.

FIG. 2 is a flowchart illustrating some procedural steps of a so-called implicit method according to an example embodiment. The method is referred to as an implicit method since there is no reception of an explicit instruction to poll the I/O range as in the method illustrated in FIG. 1. While an application in the embodiment described in FIG. 1 typically issues an explicit poll instruction, this may not always be the case. Some applications may, instead of an explicit poll instruction to the CPU, be configured to perform polling and control the polling within the application program code. For example, an application may be configured to repeatedly read a certain I/O port or an I/O range until input is found, thus implicitly performing polling. Hence in some embodiments including the method in the example embodiment of FIG. 2, polling is instead detected.

In the example embodiment, a control circuitry controls the operations of a Central Processing Unit (CPU) associated with a nominal clock frequency. The CPU is coupled to an input/output (I/O) range and configured to deliver input to an application. The method comprises a step 200 of detecting polling of an I/O range for input to the application.

In the step 210, a predetermined number of polls not resulting in input, i.e. negative polls are detected. This is achieved by the control circuitry monitoring whether or not each poll results in input to the application. In some embodiments, the polling of an I/O range is detected by the control circuitry monitoring read operations on the I/O range, and a poll resulting in no input is detected by detecting a return to the same instruction to read the I/O range within a predetermined number of instructions.

On detecting the predefined number of negative polls the clock frequency at which the CPU operates, is in the step 220 adjusted down to a predetermined first clock frequency lower than the nominal clock frequency, i.e. to a reduced clock frequency.

Some embodiments of the method illustrated in FIG. 2 also comprises a step 230 of detecting a positive poll, i.e. a poll rendering input to the application, by monitoring the outcome of each poll while the CPU is operating at the reduced frequency. On detecting a positive poll, the operating frequency of the CPU is, in a step 240, adjusted up to a second predetermined clock frequency.

By detecting the polling of an I/O range the implicit method allows applications programmed to, for example, poll an I/O range by issuing read operations to also benefit from the method. Thus, even older applications not configured for requesting polling from a CPU may benefit from the claimed invention. In some embodiments, the monitoring of read operations on the I/O range may be limited to a particular I/O port, I/O address or an I/O sub range, typically assigned to the reception of input in order to speed up the monitoring and detection process.

Some CPUs allow "overclocking" (n.b. operating a CPU at a frequency higher than the associated nominal clock frequency) or some other method of boosting the operations of the CPU. The method of the example embodiment illustrated in FIG. 3 is particularly suited for use with CPUs suitable for "overclocking".

Figure 3:
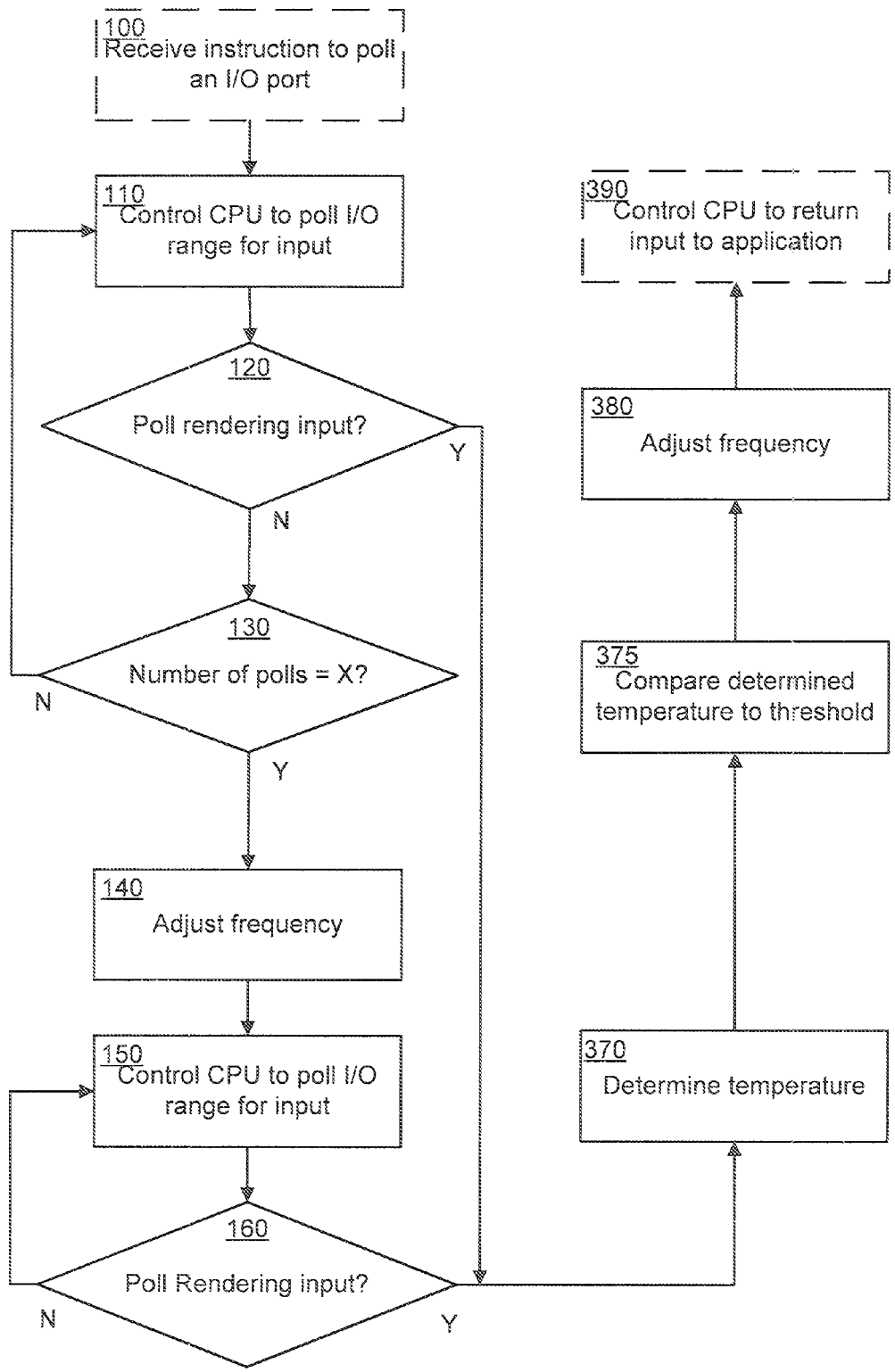
FIG. 3 is a flow diagram illustrating another alternative embodiment of a method for controlling operations of a CPU.

FIG. 3 is a flow diagram illustrating a further example embodiment of a method for controlling operations of a CPU. The method of FIG. 3 bears similarities with some of the method steps disclosed in FIG. 1, in particular steps 100-160 are similar and will not be described in detail again.

In a step 370 the method determines, when a poll results in input in either of the steps 120 or 160, a temperature of the CPU.

In another step 375 of the method, the temperature of the CPU is compared against a predefined temperature threshold. By the comparison, it is possible to detect if the CPU thermally is able to cope with a temporary boost in operating frequency without it leading to overheating of the CPU. In a step 380 the clock frequency at which the CPU operates is adjusted to a predetermined third clock frequency higher than the nominal frequency, if the temperature of the CPU is below the temperature threshold. Typically, operating a CPU above the nominal clock frequency is not sustainable over time, due to overheating of the CPU. However, as the disclosed method reduces the operating frequency of the processor below the nominal clock frequency on detecting a predetermined number of negative polls, the temperature of the CPU might allow the CPU for a short time to operate at a frequency higher than the nominal clock frequency associated with the processor without causing problems related to overheating.

In a further step 390 the CPU is controlled to return the detected input in either of step 120 or step 150 to the application.

When polling for input instead of using an interrupt driven process, the CPU continuously tries to check the I/O range for input as often as possible. The CPU thus works at full capacity polling for input. Typically the nominal clock frequency associated with the CPU is a frequency at which the manufacturer guarantees that the CPU sustainably can operate at full load. By, in step 370, measuring a temperature of the processor on receiving and detecting input to be processed, it is possible to determine if the CPU recently have been operating at or close to a maximum sustainable operating frequency. If it is determined, in step 375, that the CPU have been operating below the maximum sustainable clock frequency of the CPU, a short period of increased operation and the following increased heat generation might be allowable. If on the other hand, in step 375, it is determined that the CPU have been operating above the maximum sustainable operating frequency of the CPU, an increase of the operating frequency to a third operating frequency higher than the nominal clock frequency might lead to instability. Hence, by comparing the measured CPU temperature against a predetermined threshold value suitable for the CPU in step 375 it is possible to determine if it is wise to increase the operating frequency of the CPU to a predetermined third frequency higher than the nominal clock frequency. If the measured temperature is determined to be below the threshold value it is possible to increase the operating frequency and reduce the latency, to allow the input to be processed faster.

If it is detected in step 375 that the temperature of the CPU is above the threshold value, it might not be wise to adjust the operating frequency of the CPU to a frequency higher than the nominal clock frequency. The nominal clock frequency is typically associated with a sustainable operating frequency and in some embodiments the clock frequency at which the CPU operates is adjusted to the nominal clock frequency in step 380 if the temperature is not below the temperature threshold.

However in some embodiments, an increase of the operating frequency above nominal operating frequency might momentarily be justifiable even if the CPU temperature surpasses the threshold temperature. For example, it might be justifiable for a predetermined number of consecutive positive polls. The increase of operating frequency may for example also, be justifiable for a predefined number of clock cycles or for the processing of a predefined number of instructions in the CPU.

While FIG. 3 illustrates the step 100, where an explicit poll instruction is received, it should be understood that steps 370-390, could be combined with the implicit method of detecting polling and the alternative way of detecting positive and negative polls disclosed above in regards to FIG. 2.

It should also be understood that a system configured to perform more than one of the above example embodiments may be created.

Figure 4:
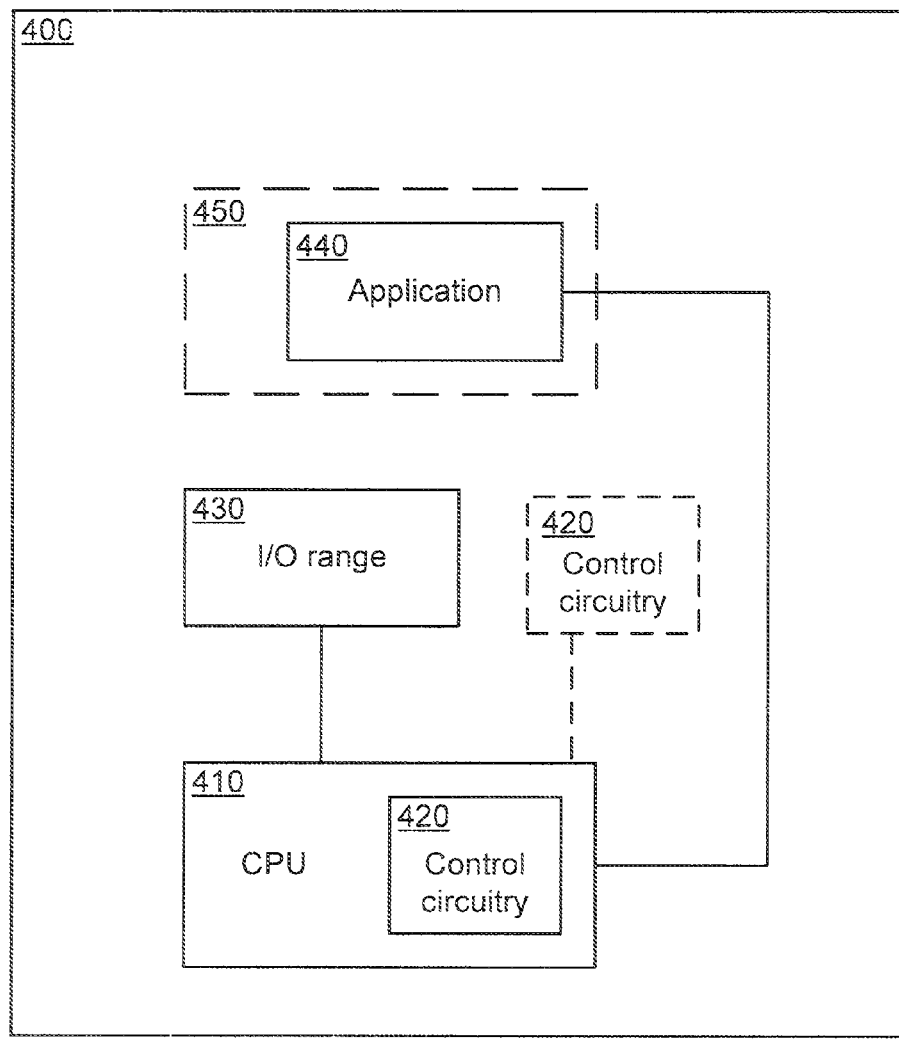
FIG. 4 is a schematic block diagram illustrating a computer server comprising a CPU and a control circuitry according to an example embodiment.

FIG. 4 illustrates an example embodiment of a computer server 400 comprising a CPU 410 and a control circuitry 420. In FIG. 4 only the elements necessary for the invention are disclosed. It should, however, be understood that the computer server 400 of FIG. 4 may comprise further elements and the disclosed elements may be part of, or comprise, further elements. For example, the computer server typically comprise some persistent storage like an hard disk drive and a data bus for interconnecting some of the elements with each other (neither explicitly disclosed in the figure). The computer server 400 also comprises a memory unit 450, or storage medium, comprising an application 440; and an Input/output (I/O) range 430 associated with at least one I/O device (the device not explicitly shown in FIG. 4) for receiving input.

The application 440 is a set of computer readable instructions to be executed in the CPU 410.

The memory 450, while illustrated and referenced below as one memory, can comprise a set of memories. The memory 450 typically stores computer instructions which are to be executed. The memory unit 450 is typically a Random Access Memory (RAM), a Read Only Memory (ROM) or a non-volatile memory unit. In some embodiments of the present invention the storage medium is a CD-rom disk, a blue-ray disk, a HDD (hard disc drive), a USB (Universal Serial Bus) unit connected to the computer server 400 or one of the many other means suitable for storing computer readable instructions.

Typically each I/O device comprises a range of I/O ports of which at least one is addressed for each I/O operation directed at the device. In general, each of the I/O ports of the I/O devices within the computer server is "numbered" to distinguish each I/O port from every other I/O port. The number which identifies a particular I/O port is often called its address. The computer server 400 may support Direct Memory Access (DMA) technique. The DMA technique allows for I/O devices to write and read data directly to and from the memory 450, via the data bus, surpassing the CPU 410. Typically, in order to support DMA the I/O device(s) and corresponding I/O ports(s) are mapped to a particular section of the memory. The CPU 410 when instructed to read (or write to) the I/O device in such an instance typically reads (or writes to) the parts of the memory that the I/O port(s) on the I/O device are mapped onto.

The CPU 410, when executing an I/O read (or write) operation, typically addresses one or more I/O port(s) of the I/O device but may for I/O operations also, as described above, address a section of the memory, when I/O ports are mapped to the memory 450. The term I/O range is herein used to interchangeably refer to: a single I/O port, multiple I/O ports or a set of memory address wherein each address corresponding to a section of the memory when I/O devices are mapped the memory; for which input can be expected to be received or found (when mapped).

In the example embodiment illustrated in FIG. 4, the CPU 410, in order to perform a particular I/O operation, thus locates and addresses the I/O range 430 corresponding to the intended I/O ports of the I/O device to be affected by the particular operation.

In the example embodiment of FIG. 4 the CPU comprises the control circuitry 420. In some alternative embodiments the control circuitry 420 is not part of the CPU 410 but is instead comprised in the computer server 400 and coupled to the CPU 410 as indicated by an alternative dashed control circuitry.

The CPU 410 is associated with a nominal clock frequency and the control circuitry 420 is arranged to control the CPU 410. The CPU 410 is further coupled to an I/O range 430 and configured to deliver input received at the I/O range 430 to an application 440. The control circuitry 420 is arranged to instruct the CPU 410 to poll the I/O range 430 for input to the application.

The control circuitry 420 is also arranged to monitor whether or not a poll results in input to the application 440. The control circuitry 420 is further arranged to adjust the clock frequency at which the CPU 410 operates based on the result of the polling operation in accordance with one or several of the method steps 140, 180, 220, 240, 380 described above and illustrated in FIGS. 1, 2 and 3 respectively.

By monitoring whether or not each poll results in input, a number of consecutive polls rendering the same result can be detected. For example a predefined number of consecutive polls rendering no input, negative polls, may be detected. When detecting that a predefined number of consecutive negative polls have come to pass, the clock frequency fed to the CPU is adjusted down to a predetermined first clock frequency lower than the nominal clock frequency. The continued polling for input will then be performed at a frequency below the nominal frequency. As a result fewer negative polls will be detected for each period of time.

The pre-defined number of polls allowed before the clock frequency at which the CPU operates is adjusted down is preferably chosen in accordance with the requirements of a particular implementation as described above in relation to the methods illustrated in FIGS. 1-3.

In some embodiments, the CPU 410 is configured to receive, from the application 440 an instruction to poll the I/O range 430 until a poll results in input to the application. The CPU 410 is further arranged to poll the I/O range 430 in response to reception of the instruction from the application 440.

In some embodiments the control circuitry 420 is configured to control the CPU 410 to poll the I/O range 430 in response to reception of an instruction from the application 440 to poll the I/O range 430 for input to the application until a poll results in input to the application.

In some embodiments, the control circuitry 420 is arranged to monitor whether or not a poll results in input to the application by monitoring read operations on the I/O range 430.

In some embodiments, the control circuitry 420 is configured to detect polling of the I/O range 430. The control circuitry is further arranged to detect a poll resulting in no input by being arranged to detect, within a predetermined number of instructions following a performed read operation on the I/O range 430, a return to the same instruction to read the I/O range 430.

In some embodiments, the control circuitry 420 is further arranged to adjust the clock frequency at which the CPU 410 operates, in accordance with one or several of the steps 180, 240 described above and illustrated in FIGS. 1 and 2, to a predetermined second clock frequency, when a poll results in input to the application 440.

In order to allow for low latency, when a poll actually results in input, the clock frequency at which the CPU operates is in some embodiments increased to a predetermined second frequency. In some embodiments, the predetermined second clock frequency equals the nominal clock frequency.

In some embodiments the predetermined second clock frequency is higher than the nominal clock frequency. Typically the polling at a frequency lower than the nominal clock frequency consumes less energy than polling at the nominal frequency. Thus, in situations where a number of consecutive negative polls higher than the pre-defined number of polls have been performed and the operating frequency is reduced, less heat will have been induced in the CPU. The CPU can in such situations for a short time be allowed to operate at a frequency higher than the nominal clock frequency. This provides for a more thermally efficient system where energy and heat generation is focused on situations where there is input to process.

In some embodiments the control circuitry 420 is also arranged to perform the steps 370-380 described above and illustrated in FIG. 3. Thus, for some embodiments, the control circuitry 420 is further arranged to determine, when a poll results in input, a temperature of the CPU 410; and to compare the temperature of the CPU against a predefined temperature threshold. The control circuitry 420 is further configured to adjust the clock frequency at which the CPU 410 operates to a predetermined third clock frequency higher than the nominal clock frequency, if the temperature of the CPU is below the temperature threshold.

In situations where the temperature of the CPU can be determined to be less than a pre-defined temperature threshold, the operating frequency of the CPU can be increased to a predetermined third clock frequency higher than the nominal clock frequency in order to reduce latency when processing a received input.

In situations where the temperature of the CPU is above or equal to the temperature threshold, operation of the CPU at a frequency higher than the nominal clock frequency may lead to overheating. In some embodiments, the control circuitry 420 is arranged to adjust the clock frequency at which the CPU 410 operates to the nominal clock frequency if the temperature is not below the temperature threshold.

In some embodiments, which are further elaborated on below in regards to FIG. 6, the CPU is arranged to poll the I/O range 430 by bypassing an operating system kernel of the CPU 410. By letting the application, through the use of a hardware instruction library, poll the I/O range directly the latency can be further reduced.

Figure 6:
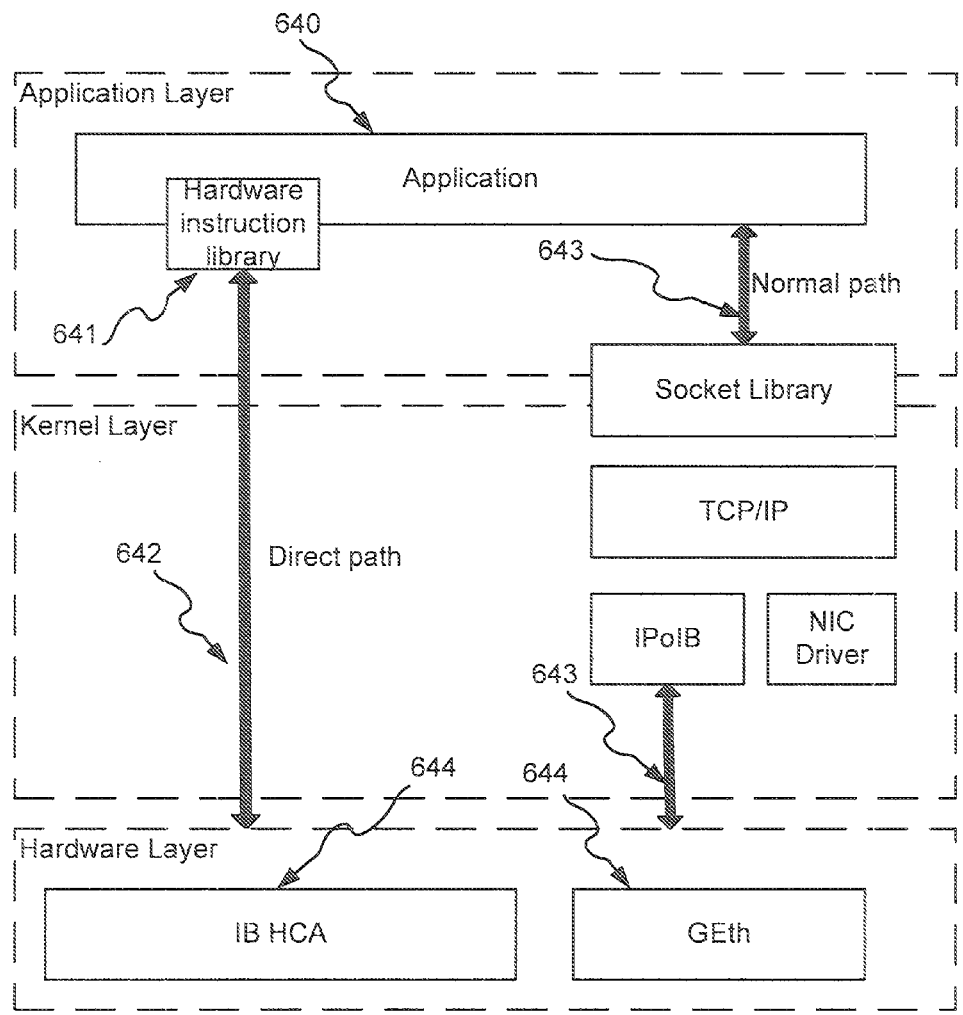
FIG. 6 is a schematic block diagram illustrating a layered topology of data processing in accordance with some embodiments.

FIG. 6 illustrates a layered topology of data processing in accordance with some embodiments. FIG. 6 is to some extent an alternative or complementary illustration of the computer server 400 illustrated in FIG. 4. Both the application layer and the kernel layer in FIG. 6 relates to processing done in a CPU 410 of a computer server. Typically an application 640 when executed in the CPU 410 interacts with an operating system, (OS) being executed in the CPU 410. The processing in the CPU 410 prompted by the application is in FIG. 6 represented by the application layer. The application 640 corresponds to application 440 in FIG. 4. The OS is not explicitly disclosed in FIG. 6; however, the processing prompted by the OS is in FIG. 6 represented by the kernel layer. The main component of the operating system is typically referred to as an OS kernel. The OS kernel provides a bridge between the application 640 and the actual data processing in peripheral hardware devices 644 of the computer. Examples of such peripheral hardware devices 644 are an InfiniBand (IB) I/O controller card and a gigabit Ethernet I/O controller card, but could be any type of network adapter or network interface card. Peripheral hardware devices 644 used for input and output are below referenced as peripheral I/O devices. Each peripheral I/O device is associated with at least one I/O port, and any subset of all the I/O ports of all the peripheral I/O devices, could constitute an I/O range similar to the I/O range 430 previously disclosed in FIG. 4.

In the following OS and OS kernel is interchangeably used when referring to the operating system (while the OS not explicitly disclosed in FIG. 6, the processing by the OS is in FIG. 6 represented by the kernel layer). The application 640 requesting resources or communicating with a peripheral device 644 (in hardware layer) is not required to have explicit knowledge of the peripheral device's 644 characteristics. The OS kernel typically has a device driver installed for all connected peripheral hardware devices 644. When the OS kernel receives instructions from the application 640, the OS kernel translates the instructions into instructions comprehendible by the peripheral device 644. Vice versa the OS can translate instructions/data from the peripheral hardware device 644 into a format comprehendible by the application 640. Double arrows 643 schematically illustrate a path through which the application 640 normally interacts with peripheral hardware devices 644. In order for the CPU 410 to switch between processing in application layer and processing in kernel layer a context switch is required.

While accessing system I/O resources typically is done through calls from the application 640 to the operating system kernel and induces at least one context switch, it is possible for the application 640 to comprise hardware instructions that are acceptable to peripheral I/O devices 644. The application 640 in application layer can, by comprising a hardware instruction library 641 with instructions suitable for a particular peripheral I/O device 644 in hardware layer, interact with the particular peripheral I/O device 644 directly as schematically illustrated by a double arrow 642 in FIG. 6, i.e. surpassing the kernel layer.

Sometimes it is advantageous to bypass an operating system when performing certain I/O tasks in order to further reduce the latency and increase the throughput of a computer system. By bypassing the operating system kernel, the application 640 with the use of the hardware instruction library 641 can control the CPU 410 to poll an I/O range 430. By configuring the application through the use of a hardware instruction library to poll the I/O range directly, no context switch between the application and the OS kernel in the CPU 410 is necessary for the polling and the latency can be further reduced. Thus, in some embodiments, the CPU 410 is arranged to poll the I/O range 430 by bypassing an operating system kernel of the CPU 410.

An additional advantage of the disclosed method and the control circuitry is the ability to detect polling and detect a predetermined number of negative polls which allows the control circuitry to control the operations of the CPU regardless if the computer architecture allows an application to bypass an operating system.

Figure 5:
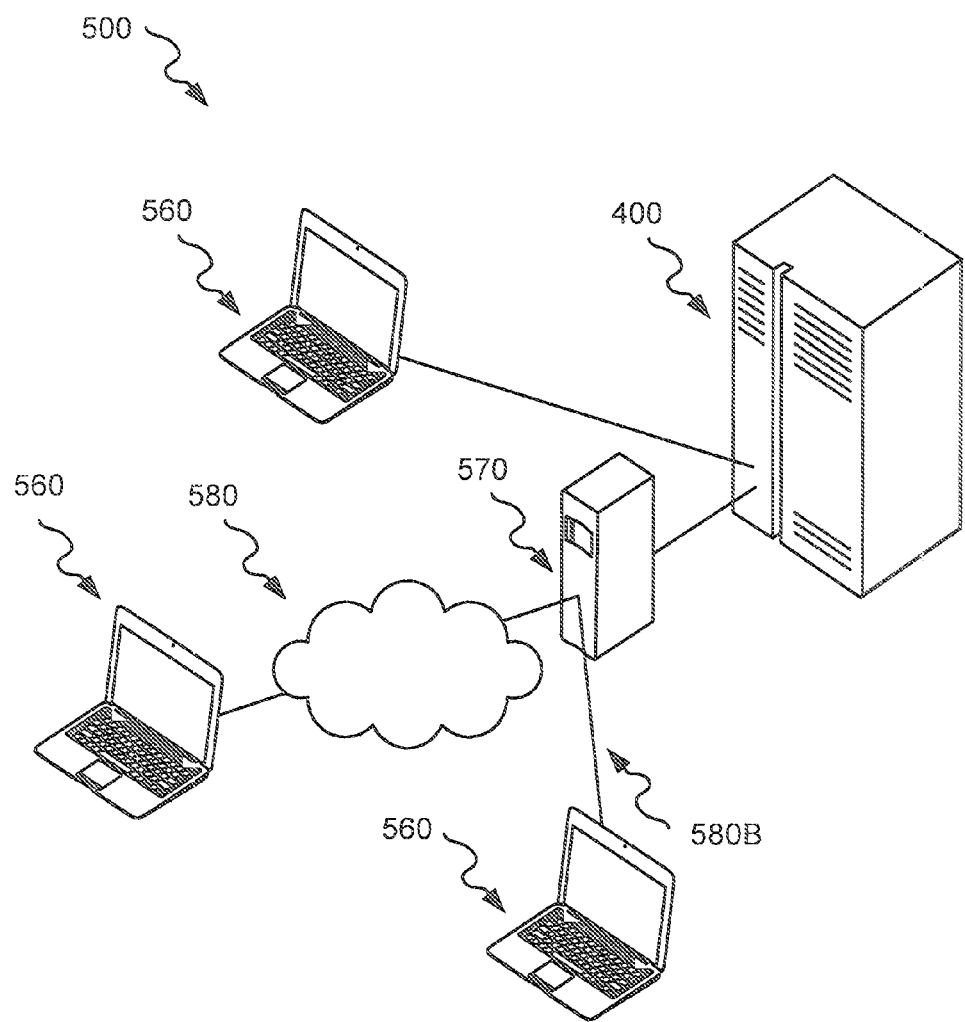
FIG. 5 is a schematic illustration of an automated exchange system including an embodiment of an automated exchange.

FIG. 5 illustrates an example embodiment of an automated exchange system 500 comprising trader terminals 560 that are used for issuing order data messages, i.e. input data, from clients to a central computer server, i.e. an automated exchange, 400 operating in accordance with one of the above disclosed methods. The automated exchange 400 may e.g. be embodied in accordance with the example computer server 400 illustrated in FIG. 4. The trader terminals 560 are connectable, for example over the Internet 580, or over some other connection means like a dedicated fiber 580B, to the automated exchange 400. The automated exchange 400 of FIG. 5 may in some embodiments be embodied as a cluster of automated exchanges. Sometimes the trader terminals 560 are connected to the automated exchange 400 through an entry gateway 570. The entry gateway 570 is connected to the central computer server hosting the automated exchange 400, and is configured to receive market actions, i.e. orders and/or quotes from the trader terminals 560. An entry gateway 570 is usually in connection with the automated exchange 400 on a dedicated network and forwards the market actions to the automated exchange 400 and further usually broadcast updates back to the trader terminals 560. It should however be understood that information being communicated to and from the automated exchange 400 and the trader terminals 560 could be communicated via a single communication path. Typically, the automated exchange 400 matches the orders received from the trading terminals in a matching process. The matching process of the automated exchange 400 is one typical implementation of the application 440 in FIG. 4.

As mentioned above, the automated exchange 400 may be embodied in accordance with the example computer server illustrated in FIG. 4. For this particular embodiment the central computer server 400 of the automated exchange system 500 in FIG. 5, expressed in terms of the functional units of FIG. 4, comprises an input/output, I/O, range 430 for receiving orders from trader terminals 560. The central computer server also includes a CPU 410, coupled to the I/O range 430, and a control circuitry 420. The CPU 410 of the central computer server is associated with a matching process for matching received orders, corresponding to the application 440 of FIG. 4. The matching process 440 is arranged to control the CPU 410 of the central computer server to poll said I/O range 430 for received orders for input to the matching process 440.

The central computer server of an automated exchange system (i.e. the automated exchange) comprising a control circuitry in accordance with embodiments described herein has the advantage that incoming input (i.e. orders) can be detected and processed at an earlier stage than with an interrupt driven process. The central computer server also has the advantage that during troughs in load the automated exchange wastes less clock cycles on negative polls. The reduced number of negative polls leads to a more energy efficient server. Some embodiments of the computer server also have the advantage that as soon as an order is received and detected, the central computer server is ready to process the order at nominal clock frequency, thus allowing for a high throughput and a low latency. A central computer server of the present invention may thus allow for a low latency and energy efficient automated exchange suitable for high throughput.

An advantage of certain embodiments described above is that incoming input, such as orders to an automated exchange, can be detected and processed at an earlier stage than with an interrupt driven process. Another advantage of some of the embodiments is that that during troughs in load less clock cycles are wasted. Hence by reducing the number of negative polls the system becomes more energy efficient. A further advantage of some of the embodiments is that as soon as an order is received and detected the central computer server is ready to process the order at nominal clock frequency, thus allowing for a high throughput and a low latency. An additional advantage of some of the embodiments is that the energy consumption is reduced by polling at a reduced frequency. By operating the CPU at a reduced frequency less electrical energy is also converted in thermal energy, allowing for the operating frequency of the CPU to be increased above the nominal operating frequency when processing a received input. This may in turn allow for latency to be reduced considerably and throughput to be increased while maintaining a stable system.

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A method for use in a system including control circuitry for controlling operations of a processor, wherein the processor is associated with an input/output (I/O) range, has a nominal clock frequency, and is configured to deliver input to an application, the method comprising:
   at the control circuitry:
      controlling the processor to perform one or more polls of the I/O range;
      monitoring whether each of the polls is a positive poll or a negative poll, wherein a poll is a positive poll when it results in detection of input data for the application at the I/O range and is a negative poll when it does not result in the detection of input data for the application at the I/O range; and
      in response to determining that a given number of the polls are negative polls, adjusting a clock frequency at which the processor operates to a first clock frequency that is lower than the nominal clock frequency.

2. The method of claim 1, wherein the controlling the processor to perform the polls is performed in response to an instruction from the application.

3. The method of claim 1, wherein the monitoring involves monitoring read operations on the I/O range, and a negative poll is detected by detecting, within a given number of instructions following a performed read operation on the I/O range, a return to the same instruction to read the I/O range.

4. The method of claim 1, wherein the processor is a central processing unit (CPU).

5. The method of claim 1, wherein the control circuitry is included within the processor.

6. The method of claim 1, wherein the control circuitry is not included within the processor.

7. The method of claim 1, wherein the I/O range is one of:
   an I/O port; or
   a memory address to which an I/O device is mapped.

8. A method for use in a system including a processor, wherein the processor has a nominal clock frequency, is associated with an input/output (I/O) range, and is configured to deliver input to an application, the method comprising:
   at the processor:
      performing one or more polls of the I/O range;
      monitoring whether each of the polls is a positive poll or a negative poll, wherein a poll is a positive poll when it results in detection of input data for the application at the I/O range and is a negative poll when it does not result in the detection of input data for the application at the I/O range; and
      in response to determining that a given number of the polls are negative polls, adjusting a clock frequency at which the processor operates to a first clock frequency that is lower than the nominal clock frequency.

9. The method of claim 8, wherein the polls are performed in response to an instruction from the application.

10. The method of claim 8, wherein the monitoring involves monitoring read operations on the I/O range.

11. The method of claim 10, wherein a negative poll is detected by detecting, within a given number of instructions following a performed read operation on the I/O range, a return to the same instruction to read the I/O range.

12. The method of claim 8, wherein the processor is a central processing unit (CPU).

13. The method of claim 8, wherein the I/O range is an I/O port.

14. The method of claim 8, wherein the I/O range is a memory address to which an I/O device is mapped.

15. The method of claim 8, wherein the given number of the polls is one.

16. A computing device, comprising:
   an input/output (I/O) range; and
   a processor that has a nominal clock frequency, is coupled to the I/O range, and is configured to execute an application;
   wherein the processor is configured to perform actions that include:
      performing one or more polls of the I/O range;
      monitoring whether each of the polls is a positive poll or a negative poll, wherein a poll is a positive poll when it results in input data for the application and is a negative poll when it does not result in input data for the application; and
      in response to determining that a given number of the polls are negative polls, adjusting a clock frequency at which the processor operates to a first clock frequency that is lower than the nominal clock frequency.

17. The computing device of claim 16, wherein the polls are performed in response to an instruction from the application.

18. The computing device of claim 16, wherein the monitoring involves monitoring read operations on the I/O range.

19. The computing device of claim 16, wherein the I/O range is an I/O port.

20. The computing device of claim 16, wherein the I/O range is a memory address to which an I/O device is mapped.

* * * * *